United States Patent
Yano et al.

(10) Patent No.: US 8,488,024 B2
(45) Date of Patent: Jul. 16, 2013

(54) IMAGE CAPTURE DEVICE

(75) Inventors: Shuji Yano, Osaka (JP); Toshiyuki Nakashima, Hyogo (JP)

(73) Assignee: Panasonic Corporation, Osaka (JP)

( * ) Notice: Subject to any disclaimer, the term of this patent is extended or adjusted under 35 U.S.C. 154(b) by 141 days.

(21) Appl. No.: 13/023,816

(22) Filed: Feb. 9, 2011

(65) Prior Publication Data

US 2011/0298952 A1    Dec. 8, 2011

(30) Foreign Application Priority Data

Feb. 10, 2010  (JP) ................................. 2010-027235

(51) Int. Cl.
*H04N 5/262*  (2006.01)

(52) U.S. Cl.
USPC ..................................................... 348/240.2

(58) Field of Classification Search
USPC ........... 348/240.99, 240.1–240.3, 234, 222.1, 348/251, 241
See application file for complete search history.

(56) References Cited

U.S. PATENT DOCUMENTS

| 6,489,993 | B1* | 12/2002 | Sato et al. | 348/240.3 |
| 7,596,286 | B2* | 9/2009 | Nose et al. | 382/300 |
| 7,868,934 | B2* | 1/2011 | Yamamoto | 348/240.2 |
| 2008/0122951 | A1* | 5/2008 | Yamamoto | 348/240.2 |

FOREIGN PATENT DOCUMENTS

JP    2002-305678    10/2002

* cited by examiner

*Primary Examiner* — Tuan Ho
*Assistant Examiner* — Ahmed A Berhan
(74) *Attorney, Agent, or Firm* — Renner, Otto, Boisselle & Sklar, LLP (57) ABSTRACT

The image capture device of this invention includes: an optical system for producing a subject image; an imager, which receives the subject image and outputs an image signal representing the subject image; and an image processing section for zooming in on, or out, a given image based on the image signal and in accordance with information about a zoom power specified, to generate a new image signal with the zoom power changed. Until the zoom power specified reaches a predetermined value, the processing section zooms in on the image by interpolating pixels so that degree of sharpness given to the image increases. If a value representing illuminance of the image is a predefined value or more and if the zoom power is the predetermined value or more, the processing section fixes the degree of sharpness given to the image. And if the value representing the illuminance of the image is less than the predefined value and if the zoom power specified is the predetermined value or more, the processing section decreases the degree of sharpness given to the image.

5 Claims, 9 Drawing Sheets

IMAGE CAPTURE DEVICE

BACKGROUND OF THE INVENTION

1. Field of the Invention

The present invention relates to an image capture device and more particularly relates to an image capture device with electronic zoom capability.

2. Description of the Related Art

Japanese Patent Application Laid-Open Publication No. 2002-305678 discloses an electronic camera. That electronic camera can do "electronic zooming", which is a kind of image magnification process for zooming in on a part of the image data that has been captured with a CCD. That is to say, the electronic zooming is a process for magnifying only a portion of the given image according to the zoom power specified. That is why the higher the zoom power, the lower the quality of the image magnified.

The electronic camera disclosed in that patent document determines whether or not the number of pixels of that part of the image data to be subjected to the electronic zooming is equal to or smaller than that of pixels of the image to be written on a memory card. If the answer is YES, then the electronic camera instructs a display device in the viewfinder to post an alert.

Then, the user can know in advance that such a poor looking image that has been obtained by that electronic zooming is going to be written on the memory card and can prevent the camera from doing that if he or she doesn't like such an image.

The electronic camera disclosed in Japanese Patent Application Laid-Open Publication No. 2002-305678 can certainly prevent such an image with debased image quality, which is often the case with electronic zooming, from being recorded but does not provide any technique for capturing a great looking image even if the user has specified a high zoom power for electronic zooming.

SUMMARY OF THE INVENTION

It is therefore an object of the present invention to provide an image capture device that can produce a great looking image even if the user has specified a high zoom power for electronic zooming.

An image capture device according to the present invention includes: an optical system for producing a subject image; an imager, which receives the subject image and outputs an image signal representing the subject image; and an image processing section for zooming in on, or zooming out, a given image based on the image signal and in accordance with information about a zoom power specified, to generate a new image signal with the zoom power changed. Until the zoom power specified reaches a predetermined value, the image processing section zooms in on the image by interpolating pixels so that degree of sharpness given to the image increases. If a value representing illuminance of the image is equal to or greater than a predefined value and if the zoom power specified has reached, or exceeded, the predetermined value, the image processing section fixes the degree of sharpness given to the image. And if the value representing the illuminance of the image is less than the predefined value and if the zoom power specified has reached, or exceeded, the predetermined value, the image processing section decreases the degree of sharpness given to the image.

The image processing section may generate at least one interpolated pixel by making interpolation between multiple pixels that are designated by the image signal, and may change magnitude of correction to be made on pixel value of the at least one interpolated pixel according to the value representing the illuminance of the image and the zoom power specified in order to increase the degree of sharpness given to the image.

During zooming, the magnitude of correction to be made on the pixel value of the at least one interpolated pixel may be determined by using a coefficient $\alpha$ that changes with the zoom power specified. If the value representing the illuminance of the image is equal to or greater than the predefined value and if the zoom power specified has reached, or exceeded, the predetermined value, the image processing section may fix the coefficient, thereby keeping the degree of sharpness given to the image constant.

Alternatively, during zooming, the magnitude of correction to be made on the pixel value of the at least one interpolated pixel may be determined by using a coefficient $\alpha$ that changes with the zoom power specified. If the value representing the illuminance of the image is less than the predefined value and if the zoom power specified has reached, or exceeded, the predetermined value, the image processing section may decrease the coefficient $\alpha$ according to the zoom power specified, thereby decreasing the degree of sharpness given to the image.

The image processing section may calculate the magnitude of correction based on the coefficient $\alpha$, another coefficient k, which is determined by magnitude of a variation in the luminance value of the at least one interpolated pixel, and magnitude h of radio frequency components of each pixel.

According to a preferred embodiment of the present invention, if the zoom power has reached, or exceeded, a predetermined value and if a value representing the illuminance of an image is less than a predefined value (more specifically, when a shooting session is performed with a relatively high zoom power and at a relatively high noise level), the image capture device gives a constant degree of sharpness to the image. As a result, even if a high zoom power has been specified for electronic zooming, the image capture device can still produce a great looking image.

DETAILED DESCRIPTION OF PREFERRED EMBODIMENTS

Hereinafter, preferred embodiments of the present invention will be described with reference to the accompanying drawings.

The present invention is carried out as any of various kinds of electronic devices with an image capturing function. Examples of those electronic devices include digital camcorders, digital still cameras and cellphones with a camera. A computer program that is defined to operate such an electronic device and a storage medium that has stored such a computer program thereon also fall into the scope of the present invention.

A specific preferred embodiment of the present invention will now be described as being implemented as a digital camcorder.

1. Outline

A digital camcorder as a specific preferred embodiment of the present invention has electronic zoom capability. This digital camcorder carries out electronic zooming by interpolating pixels through super-resolution processing. Specifically, this digital camcorder changes the modes of processing into the one to be described later depending on whether the zoom power and the noise level of the image are relatively high or not in the given shooting environment. As a result, even if a higher zoom power has been specified for electronic zooming, a great looking image can still be captured.

2. Configuration

Figure 1:
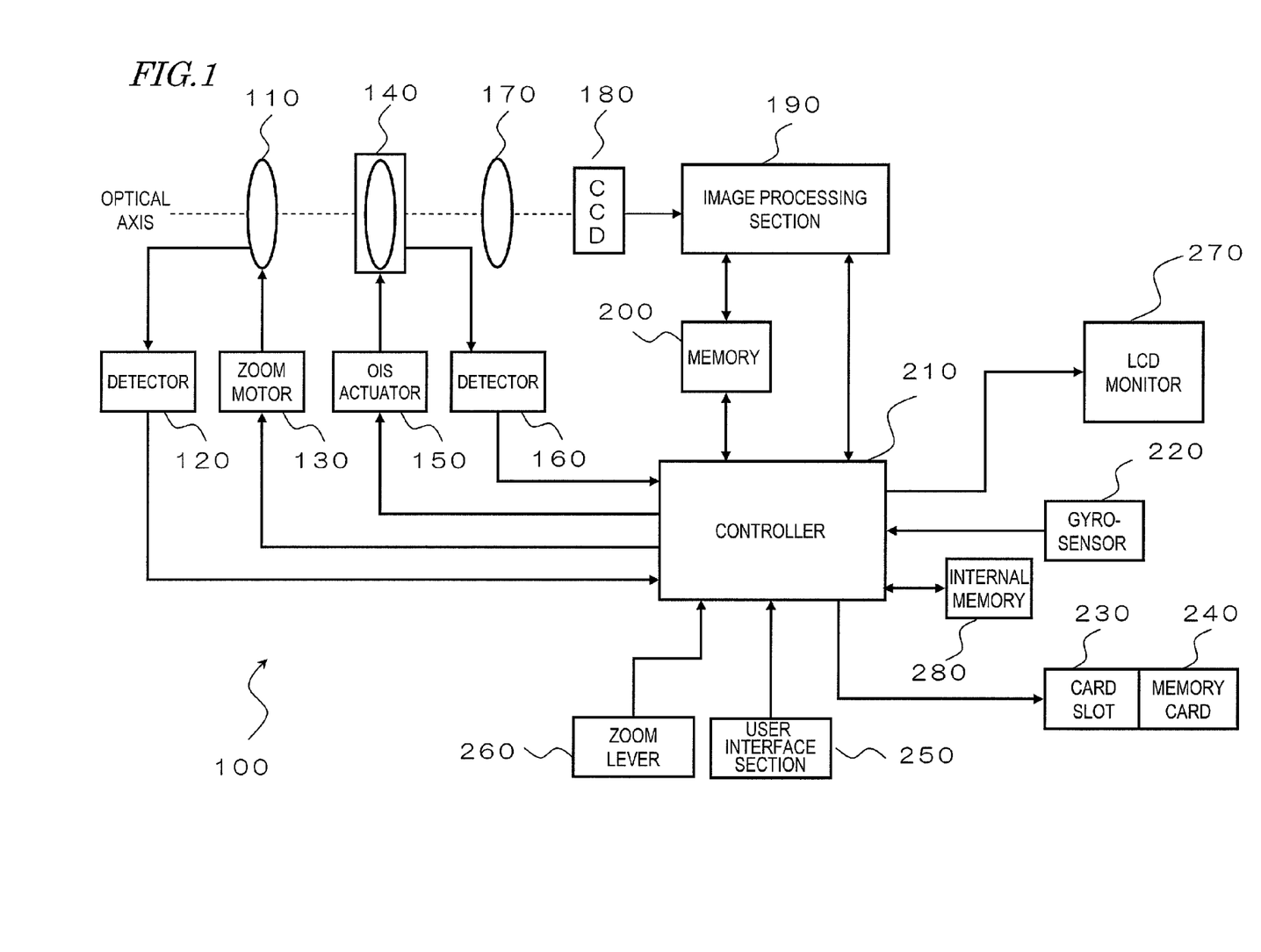
FIG. 1 is a block diagram illustrating a configuration for a digital camcorder 100.

Hereinafter, the electrical configuration of a digital camcorder as a specific preferred embodiment of the present invention will be described with reference to FIG. 1, which is a block diagram illustrating a configuration for the digital camcorder 100. This digital camcorder 100 is designed to make a CCD image sensor 180 (which will be sometimes referred to herein as an "imager") capture a subject image that has been produced by an optical system including a zoom lens 110. The video data that has been generated by the CCD image sensor 180 is subjected by an image processing section 190 to various kinds of processing and then stored in a memory card 240. If necessary, the video data stored in the memory card 240 can be displayed on an LCD monitor 270. Hereinafter, the configuration of this digital camcorder 100 will be described in further detail.

The optical system of this digital camcorder 100 is made up of the zoom lens 110, an optical image stabilizer (OIS) 140, and a focus lens 170. The zoom lens 110 moves along the optical axis of the optical system and thereby zooms in on, or zooms out, the subject image. The focus lens 170 moves along the optical axis of the optical system, thereby adjusting the focal length on the subject image.

The OIS 140 includes a stabilizer lens that can move internally within a plane that intersects with the optical axis at right angles. Specifically, in the OIS 140, the stabilizer lens is driven in such a direction as to cancel the shake of the digital camcorder 100, thereby stabilizing the subject image.

The zoom motor 130 drives the zoom lens 110. The zoom motor 130 may be implemented as a pulse motor, a DC motor, a linear motor or a servo motor, for example. If necessary, the zoom motor 130 may drive the zoom lens 110 via a cam mechanism, a ball screw, or any other appropriate mechanism. A detector 120 detects the position of the zoom lens 110 on the optical axis. As the zoom lens 110 moves in the optical axis direction, the detector 120 outputs a signal representing the position of the zoom lens through a switch such as a brush.

An OIS actuator 150 drives the stabilizer lens in the OIS 140 within a plane that intersects with the optical axis at right angles. The OIS actuator 150 may be implemented as a planar coil or an ultrasonic motor. A detector 160 senses how much the stabilizer lens has moved in the OIS 140.

The CCD image sensor 180 captures the subject image, which has been produced by the optical system including the zoom lens 110, thereby generating video data. The CCD image sensor 180 performs exposure, transfer, electronic shuttering and various other kinds of operations.

The image processing section 190 subjects the video data that has been generated by the CCD image sensor 180 to various kinds of processing. For example, the image processing section 190 processes the video data that has been generated by the CCD image sensor 180, thereby generating either video data to be displayed on the LCD monitor 270 or video data to be stored back into the memory card 240 again. The image processing section 190 may also subject the video data that has been generated by the CCD image sensor 180 to gamma correction, white balance correction, flaw correction and various other sorts of processing. Furthermore, the image processing section 190 also compresses the video data that has been generated by the CCD image sensor 180 in a compression format compliant with the H. 264 standard or the MPEG-2 standard.

The image processing section 190 can also perform electronic zooming by cropping a part of the video data that has been generated by the CCD image sensor 180. While performing the electronic zooming, the image processing section 190 can also subject the data to super-resolution processing as will be described later. The image processing section 190 may be implemented as either only a single piece of hardware or a combination of hardware and software. For example, the image processing section 190 could be a DSP or a microcomputer. More specifically, the image processing section 190 could be implemented as a microcomputer that executes a program defining the processing steps of the flowchart shown in FIG. 6 as will be described later.

The controller 210 performs an overall control on all of these components. The controller 210 may be implemented as a semiconductor device, for example, but could also be implemented as either only a single piece of hardware or a combination of hardware and software. For example, the controller 210 could be a microcomputer.

A memory 200 functions as a work memory for the image processing section 190 and the controller 210, and may be implemented as a DRAM or a ferroelectric memory, for example.

The LCD monitor 270 can display an image represented by the video data that has been generated by the CCD image sensor 180 and an image represented by the video data that has been retrieved from the memory card 240.

The gyrosensor 220 may be implemented as a kind of vibrating member such as a piezoelectric transducer. Specifically, the gyrosensor 220 vibrates the vibrating member such as a piezoelectric transducer at a constant frequency and transforms the Coriolis force produced into a voltage, thereby obtaining angular velocity information. Then, the controller 210 gets the angular velocity information from the gyrosensor 220 and gets the stabilizer lens driven in the OIS in such a direction that will cancel that shake. As a result, the shake of the digital camcorder 100 that has been generated by the user's hand or body tremors can be canceled.

The memory card 240 can be readily inserted into, or removed from, this digital camera 100 through a card slot 230, which is connectable both mechanically and electrically to the memory card 240. The memory card 240 includes a flash memory or a ferroelectric memory inside, and can store data.

An internal memory 280 may be a flash memory or a ferroelectric memory, for example, and stores a control program for performing an overall control on this digital camcorder 100.

A user interface section 250 is a member for accepting the user's instruction to capture an image. A zoom lever 260 is a member for accepting the user's instruction to change the zoom power. By turning this zoom lever 260, the zoom power can be changed continuously from the wide-angle end through the telephoto end. If the zoom lever is further turned to zoom in on the subject at the telephoto end, then the image processing section 190 starts to magnify the image data digitally.

In this preferred embodiment, the zoom lever 260 is supposed to be a hardware lever that is physically arranged on the outer surface of this digital camcorder 100. However, this is only an example of the present invention. Alternatively, the zoom lever 260 may also be an image that is displayed on the LCD monitor 270 through software. In that case, a touch-screen (not shown) may be arranged on the LCD monitor 270 and the user may put his or her finger on that image portion displayed on the LCD monitor 270, thereby getting electronic zooming done.

3. Interpolation by Super-Resolution Processing

Figure 2:
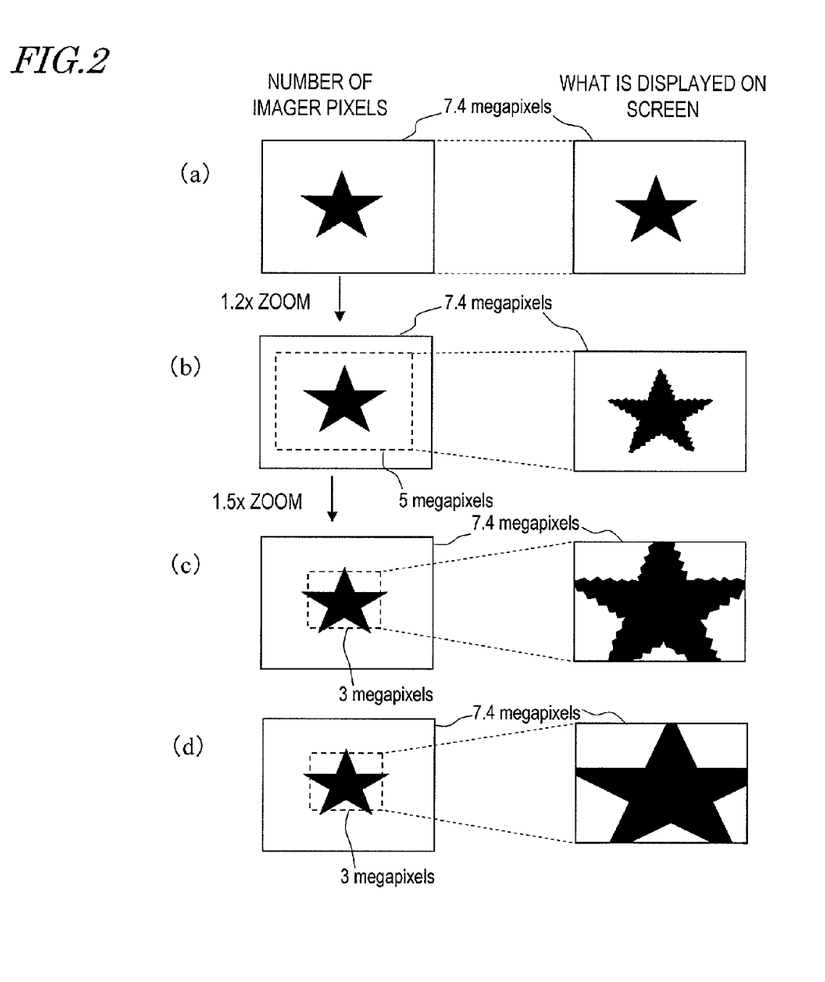
FIG. 2(a) illustrates an exemplary on-screen image that is not subjected to any electronic zooming.
FIGS. 2(b) and 2(c) illustrate exemplary on-screen images that have been zoomed in without super-resolution processing.
FIG. 2(d) illustrates an exemplary on-screen image that has been zoomed in with the super-resolution processing.

The digital camcorder 100 of this preferred embodiment performs electronic zooming (digital zooming) with interpolation by super-resolution processing. Hereinafter, it will be described with reference to FIGS. 2 and 3 exactly how to carry out that processing. As used herein, the "super-resolution processing" refers to processing for compensating for the spatial frequency that has been lost as a result of zooming.

Hereinafter, the correlation between the electronic zooming and the super-resolution processing will be described. In the following example, the respective total numbers of pixels of the CCD image sensor 180 and the LCD monitor 270 are both supposed to be 7,400,000 pixels (which will be referred to herein as "7.4 megapixels").

FIG. 2(a) illustrates an exemplary on-screen image that is not subjected to any electronic zooming. FIGS. 2(b) and 2(c) illustrate exemplary on-screen images that have been zoomed in without the super-resolution processing, while FIG. 2(d) illustrates an exemplary on-screen image that has been zoomed in with the super-resolution processing. In the example illustrated in FIG. 2(a), the zoom power is 1.0×, and therefore, image data is generated using all 7.4 megapixels of the CCD image sensor 180. As a result, the image data of those 7.4 megapixels is displayed on the LCD monitor 270 as they are.

FIG. 2(b) illustrates what image processing needs to be done if the user has specified a 1.2× zoom power. In that case, a portion of the image corresponding to inner 5 megapixels (which falls within the dashed rectangular area in FIG. 2(b)) is cropped from the entire 7.4 megapixel image that has been generated by the CCD image sensor 180. That 5 megapixel image portion that has been cropped is magnified to the size of the 7.4 megapixel image and then displayed on the LCD monitor 270. This magnification process is done to display the 5 megapixel image on the 7.4 megapixel LCD monitor 270 by covering a deficit of 2.4 megapixels by interpolation. More specifically, supposing one of the 5 megapixels is identified by P and a pixel to be interpolated adjacent to that pixel P (which will be referred to herein as an "interpolated pixel") is identified by Q, this magnification process is carried out by assigning the same pixel value as the pixel's P to the interpolated pixel Q.

Compare the two images displayed on the LCD monitor 270 in these two situations shown in FIGS. 2(a) and 2(b), and it can be seen easily that the image shown in FIG. 2(b) has a narrower angle of view than the one shown in FIG. 2(a). And if those images are displayed on the LCD monitor 270 of the same size, the image shown in FIG. 2(b) will be displayed as a magnified version of the image shown in FIG. 2(a). This is the electronic zooming for magnifying a given image digitally, not optically. In that case, the quality of the image displayed on the LCD monitor 270 will be poorer in FIG. 2(b) than in FIG. 2(a). This is because the image displayed on the LCD monitor 270 has been generated from all 7.4 megapixels in FIG. 2(a) but from only 5 megapixels in FIG. 2(b) and also because the super-resolution processing to be described later is not performed.

FIG. 2(c) illustrates what image processing needs to be done if the user has specified a 1.5× zoom power. In that case, a portion of the image corresponding to inner 3 megapixels (which falls within the dashed rectangular area in FIG. 2(c)) is cropped from the entire 7.4 megapixel image that has been generated by the CCD image sensor 180. That 3 megapixel image portion that has been cropped is magnified to the size of the 7.4 megapixel image and then displayed on the LCD monitor 270. The image shown in FIG. 2(c) will be displayed on the LCD monitor 270 as a further magnified version of the image shown in FIG. 2(b). As for the quality of the image displayed on the LCD monitor 270, the image quality will be even poorer in FIG. 2(c) than in FIG. 2(b) for the same reasons as what has just been described.

FIG. 2(d) illustrates what if the super-resolution processing is performed. In the super-resolution processing, a new pixel value is created based on respective values of multiple pixels of the CCD image sensor 180 and then a pixel with that new value is inserted to between those pixels. As can be seen from FIGS. 2(b) and 2(c), the image quality decreases with the electronic zooming. In other words, the spatial frequency of the image is lost as a result of the electronic zooming. That is why by making interpolation on the pixels of the CCD image sensor 180 with the values of non-existent pixels by performing the super-resolution processing, the spatial frequency of the image can be compensated for.

Next, a specific example of the super-resolution processing will be described with reference to FIG. 3.

Figure 3:
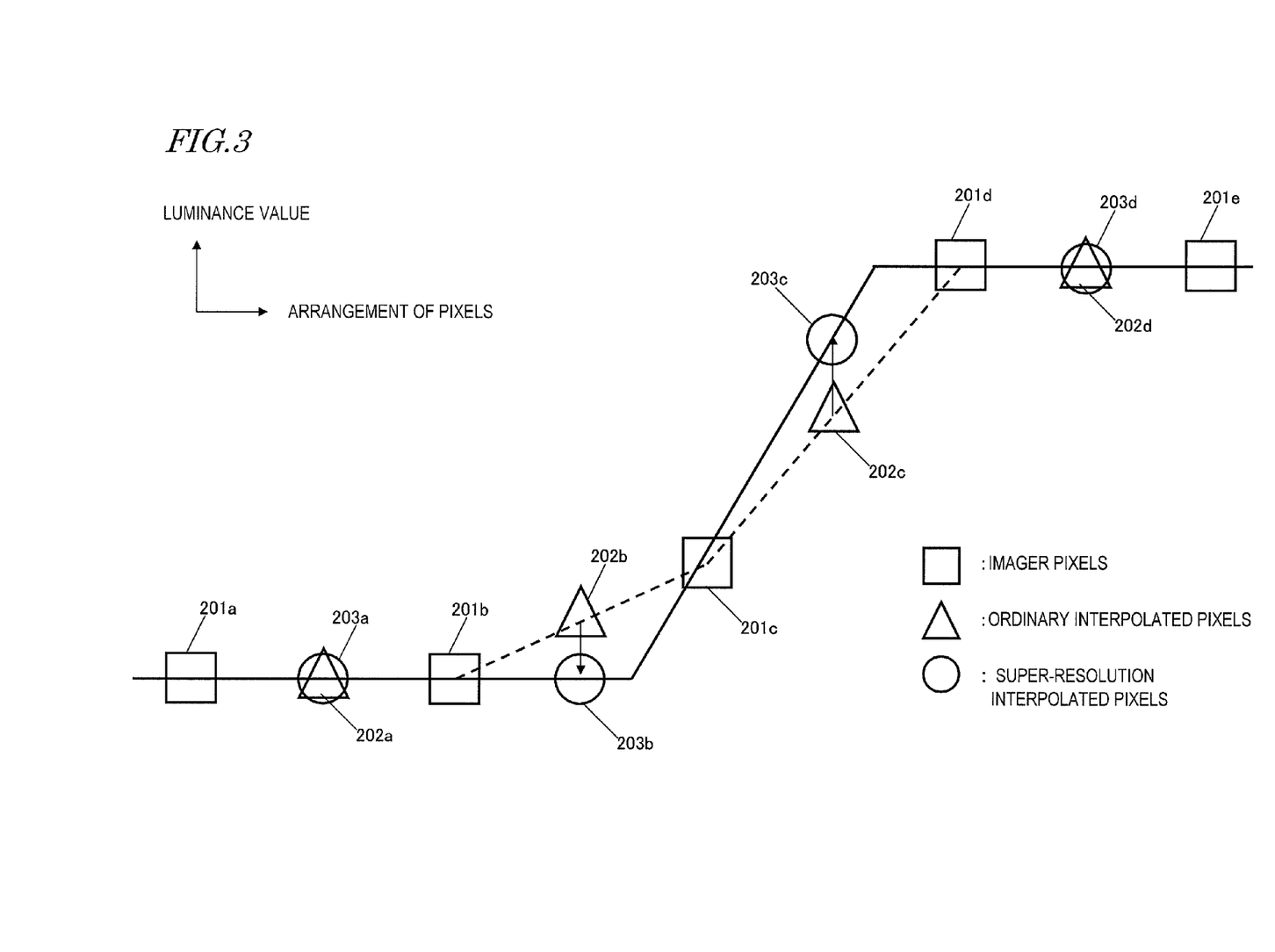
FIG. 3 is a schematic representation illustrating how to interpolate pixels by super-resolution processing.

FIG. 3 is a schematic representation illustrating how to interpolate pixels by super-resolution processing.

In this preferred embodiment, the given image data is supposed to be digitally magnified 2.0× both vertically and horizontally with interpolation by super-resolution processing. In FIG. 3, however, only the horizontal magnification is shown for the sake of simplicity.

In FIG. 3, the arrangement of pixels on a horizontal line is shown horizontally and the respective pixel values (more specifically, the respective luminance values) of those pixels are shown vertically. Although not shown in FIG. 3, the vertical arrangement of pixels may also be processed in the same way and the same processing may be performed even when interpolation needs to be made on arbitrary N pixels by the super-resolution processing.

The pixels 201a through 201e shown in FIG. 3 represent the values of pixels that have been obtained by the CCD image sensor 180 and then processed by the image processing section 190 but are not subjected to the digital zooming yet. Using the pixel values of these pixels 201a through 201e that are not subjected to the magnification yet, the image processing section 190 generates interpolated pixels one by one at regular intervals between two adjacent pixels. As a result of such digital zooming, the number of pixels is doubled.

Specifically, each interpolated pixel is generated in the following manner. First, the image processing section 190 separates luminance and chrominance values from each pixel value that has been obtained by the CCD image sensor 180. Next, the luminance value is subjected to the super-resolution processing and the chrominance value is subjected to linear interpolation processing and bi-cubic interpolation processing, for example.

Hereinafter, it will be described in detail how to carry out the super-resolution processing on the luminance value. In this preferred embodiment, the image processing section 190 performs linear interpolation processing using the luminance value separated from the pixel value that has been obtained by the CCD image sensor 180, thereby generating a luminance value for an interpolated pixel.

The pixels 202a through 202d shown in FIG. 3 are linearly interpolated pixels that have been generated by linear interpolation. As shown in FIG. 3, the linear interpolation is processing to be performed by the image processing section 190 to generate an interpolated pixel right at the middle point between each pair of pixels 201a through 201e that are connected together in line before subjected to the magnification.

The digital camcorder 100 of this preferred embodiment generates such an interpolated pixel by performing an ordinary kind of interpolation processing such as the linear interpolation and then performs a different kind of interpolation processing to give sharpness to the video, which gets done by adding a correction value to each interpolated pixel that has been generated by the linear interpolation.

First of all, the image processing section 190 extracts the magnitudes of variation in signal from each of the pixels 201a through 201e and classifies those variations into flat portions with hardly changing signal levels and edge portions with steeply changing signal levels representing a profile, for example. At the same time, the image processing section 190 also extracts a radio frequency (RF) component from the pixel value of each of those pixels 201a through 201e. Taking the pixel 201c as an example, its RF component may be the sum (A+B) of the difference A between the respective luminance values of the pixels 201b and 201c and the difference B between the respective luminance values of the pixels 201c and 201d. The magnitude of the RF component thus extracted will be identified herein by h, which is a value with a positive or negative sign.

According to this preferred embodiment, the magnitude of correction $\delta$ is introduced in order to give sharpness to the video. The image processing section 190 calculates the magnitude of correction $\delta$ by multiplying the magnitude of RF component h by a coefficient k. Then, the image processing section 190 adds the magnitude of correction $\delta$ (=kh) thus obtained to the respective luminance values of the linearly interpolated pixels 202a through 202d. If interpolation needs to be made at a location surrounded with a flat portion, the image processing section 190 sets the coefficient k to be equal to zero or a small value. On the other hand, if the interpolation needs to be made at a location surrounded with an edge portion, the image processing section 190 sets the coefficient k to be greater than the one for the flat portion. It should be noted that upper and lower limits are preferably set with respect to the magnitude of correction $\delta$. This is because if the magnitude of correction $\delta$ used had too large an absolute value, then either overshoot or under shoot would occur at the edge portion of the image, thus making the image look poor and unnatural. However, by setting an upper limit to the value of the coefficient k, the upper and lower limits of the magnitude of correction $\delta$ can be adjusted.

In FIG. 3, super-resolution interpolated pixels 203a through 203d are interpolated pixels that have been subjected to the super-resolution processing by adding the magnitude of correction $\delta$ to the linearly interpolated pixels 202a through 202d.

Specifically, in the example illustrated in FIG. 3, since there is no variation between the respective luminance values of the pixels 201a and 201b, the interval between the pixels 201a and 201b is regarded to be a flat portion. As a result, k=0 (i.e., magnitude of correction $\delta$=0), and therefore, the linearly interpolated pixel 202a agrees with the super-resolution interpolated pixel 203a in this case.

On the other hand, since there is a significant variation between the respective luminance values of the pixels 201b and 201d, the interval between the pixels 201b and 201d is regarded to be an edge portion, and k becomes a constant value (and k>0). As a result, the image processing section 190 adds the magnitude of correction $\delta$ (=kh) to the respective luminance values of the interpolated pixels 202b and 202c, thereby generating super-resolution interpolated pixels 203b and 203c, of which the luminance values are those sums.

But as there is no variation between the respective luminance values of the pixels 201d and 201e, the magnitude of correction $\delta$ becomes equal to zero, and therefore, the super-resolution interpolated pixel 203d agrees with the linearly interpolated pixel 202d in this case.

In the example described above, the zoom power is supposed to be 2.0×. However, the digital camcorder 100 of this preferred embodiment also applies the same idea to the electronic zooming, no matter whether the zoom power is 3.0× or 4.0×. For example, if the zoom power is 3.0×, the 3.0× digital zooming can get done by generating two interpolated pixels at regular intervals between each pair of adjacent pixels.

4. Method of Control During Zooming

Next, it will be described with reference to FIG. 4 how the digital camcorder 100 of this preferred embodiment performs a control during zooming. The method of processing the image to be displayed on the LCD panel 270 during zooming is changed by the control method to be described below.

As described above, the magnitude of correction $\delta$ is calculated by the image processing section 190 based on a variation in luminance value between pixels. The digital camcorder 100 of this preferred embodiment also controls the magnitude of correction $\delta$ even while changing the zoom power by turning the zoom lever 260. Specifically, by newly introducing another coefficient $\alpha$ for that purpose, the camcorder 100 defines the magnitude of correction $\delta$=$\alpha$kh to be made during zooming. And the image processing section 190 controls this coefficient $\alpha$ according to the zoom power. Hereinafter, the control method will be described in detail.

Specifically, the digital camcorder 100 of this preferred embodiment changes the relation between the zoom power and the coefficient $\alpha$ according to the illuminance of the shooting environment. In the following description, it will be described first with reference to FIG. 4 what processing needs to be carried out if the illuminance is kept at least equal to a particular value. After that, it will be described with reference to FIG. 5 what processing needs to be carried out if the illuminance is lower than the particular value.

In this case, the "illuminance" does not always have to be actually measured with an illuminometer (or light intensity sensor) but may also be calculated based on the output value of the CCD image sensor 180, which varies according to the illuminance level. According to this preferred embodiment, the image processing section 190 determines whether the average luminance of the image that has been generated by the CCD image sensor 180 is equal to or greater than, or less than, a threshold value, thereby deciding whether or not the illuminance reaches the required level. In the following description, a value representing the illuminance of the shooting environment will sometimes be referred to herein as an "illuminance equivalent value", no matter how that value has been obtained.

[4-1. How to Control Coefficient when Subject is Zoomed in with Sufficient Illuminance]

Figure 4:
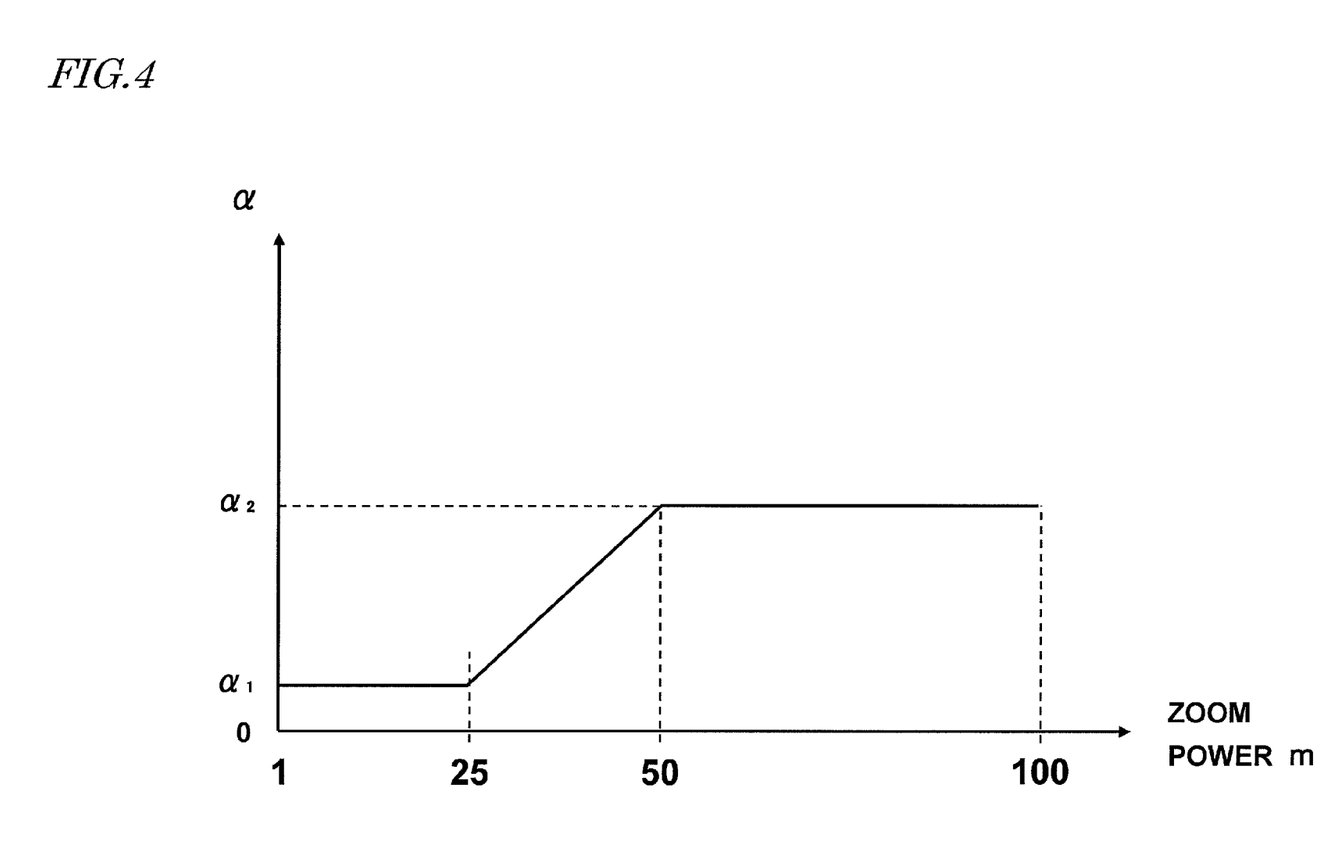
FIG. 4 shows how to change the coefficient $\alpha$ with the zoom power m when the illuminance is above the required level.

FIG. 4 shows how to change the coefficient $\alpha$ with the zoom power m when the illuminance is above the required level. In FIG. 4, the zoom power 25× is supposed to be the highest optical zoom power at the telephoto focal length and the zoom power 100× is supposed to be the highest one of all optical and electronic zoom powers combined. That is to say, the highest zoom power of the electronic zooming is four times (=100/25) as high as the highest optical zoom power.

First, it will be described what if the zoom power is from 1× through 25×. The range in which the zoom power is 1× through 25× is an optical zoom range in which the subject is optically magnified, and therefore, basically there is no need to perform the super-resolution processing. According to this preferred embodiment, however, even while the subject is optically zoomed in or out, the super-resolution processing is also performed. This is because when the light that has been reflected from the subject passes either the zoom lens 110 or the stabilizer lens in the OIS 140, the sharpness of the subject image could decrease somewhat according to the property of that optical element. This means that the spatial frequency is lost even by the optical zooming albeit slightly. That is why the present inventors believe that the super-resolution processing will also effectively contribute to compensating for the sharpness that has decreased optically. Thus, according to this preferred embodiment, the image processing section 190 fixes the $\alpha$ value at $\alpha 1$.

In the optical zoom range, the image processing section 190 obtains the magnitude of RF component h and the coefficient k by the method described above on the supposition that each interpolated pixel agrees with an imager pixel. Next, the image processing section 190 obtains the magnitude of correction $\delta$ ($=\alpha 1$ kh) by setting the coefficient $\alpha = \alpha 1$. Then, the image processing section 190 adds the magnitude of correction $\delta$ thus obtained to the pixel, thereby compensating for the sharpness that has decreased while the reflected light is passing through the lenses.

Next, it will be described how the relation between the zoom power m and the coefficient $\alpha$ changes in the zoom power range of 25× through 50×. When the zoom power m reaches or exceeds 25×, the image processing section 190 increases $\alpha$ linearly from $\alpha 1$, thereby compensating for the sharpness that has been lost as a result of digital zooming. It will be described next why such a control needs to be performed.

Suppose the zoom power of the digital zooming is dm (where dm=m/25 and m>25) and the limiting resolution of the video data when the digital zoom power dm=1 (i.e., while optical zooming is carried out) is fmax. As used herein, the limiting resolution is the resolution to be determined by the number of pixels of the CCD image sensor 180.

In that case, if the digital zoom power dm satisfies dm>1, then the limiting resolution fd satisfies fd=fmax/dm (<fmax). That is to say, the higher the digital zoom power, the lower the limiting resolution. In other words, the higher the digital zoom power, the lower the degree of sharpness and the more significantly the details are lost. For example, if the digital zoom power is 2× (i.e., when dm=2), fd=fmax/2.

In this digital camcorder 100, the digital zoom power changes continuously by turning the zoom lever. That is why the coefficient $\alpha$, by which the magnitude of correction $\delta$ is multiplied, does not change stepwise but changes linearly and continuously as shown in FIG. 4. As a result, super-resolution interpolated pixels are also generated continuously according to the magnitude of correction $\delta$. Consequently, a sufficiently high degree of sharpness can be maintained even in the edge portions representing the subject's profile, for example.

Next, it will be described how the relation between the zoom power m and the coefficient $\alpha$ changes in the zoom power range of 50× or more. Once the zoom power m exceeds 50×, the digital zoom power dm is over 2×. As described above, the higher the digital zoom power, the lower the limiting resolution of the video data magnified and the more significantly the details are lost. As for an edge portion representing a profile, on the other hand, a certain degree of sharpness can be maintained by performing the super-resolution processing. That is to say, as the digital zoom power is increased, fine details are lost more and more significantly but some degree of sharpness does remain on the profile. Consequently, the video generated by the image processing section 190 comes to look as unnatural as a painted picture.

Thus, according to this preferred embodiment, once the zoom power m has reached or exceeded 50× (i.e., if the digital zoom power dm=2× or more), the image processing section 190 fixes the coefficient $\alpha$ at $\alpha 2$ and stops making the correction to avoid increasing the degree of sharpness excessively anymore. That is why even though the degree of sharpness of the profile gradually decreases once the zoom power has reached or exceeded 50×, the details of the video as a whole are also going to be lost gradually. As a result, it is possible to prevent the video from looking overly unnatural.

As can be seen easily from the foregoing description, the method of controlling $\alpha$ when the subject is zoomed in with ample illuminance is represented by the following Equations (1):

$$\alpha = \begin{cases} \alpha 1 & (1 \leq m < 25) \\ \dfrac{\alpha 2 - \alpha 1}{25}(m - 25) + \alpha 1 & (25 \leq m < 50) \\ \alpha 2 & (50 \leq m \leq 100) \end{cases} \quad (1)$$

According to the processing described above, if the zoom power is further increased beyond the highest optical zoom power at the telephoto focal length, the digital camcorder 100 can zoom in on the subject image digitally with some degree of sharpness maintained until the zoom power reaches a certain limit. On top of that, even if the zoom power is further increased beyond that limit, it is still possible to prevent the video from looking as unnatural as a painted picture.

[4-2. How to Control Coefficient when Subject is Zoomed in with Insufficient Illuminance]

Figure 5:
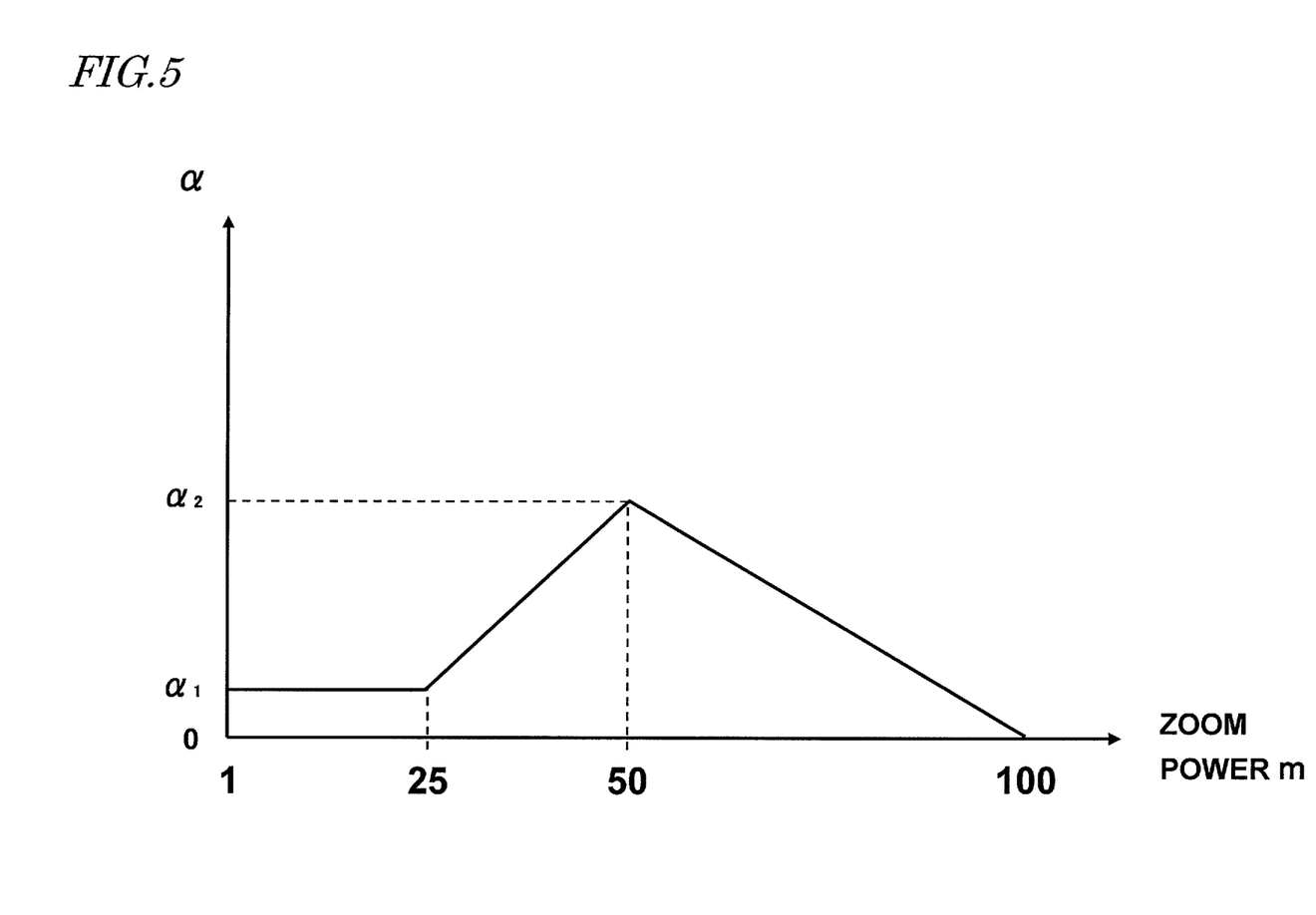
FIG. 5 shows how to change the coefficient $\alpha$ with the zoom power m when the illuminance is below the required level.

FIG. 5 shows how to change the coefficient $\alpha$ with the zoom power m when the illuminance is below the required level. In FIG. 5, the zoom power 25× is also supposed to be the highest optical zoom power at the telephoto focal length and the zoom power 100× is supposed to be the highest one of all optical and electronic zoom powers combined.

In this preferred embodiment, in the optical zoom range, the coefficient α is supposed to be fixed at α1 in order to compensate for the sharpness that has been lost due to the optical property of the lenses. On the other hand, while the zoom power falls within the range of 25× through 50×, the coefficient α is linearly increased from α1 to α2. That is to say, while the zoom power falls within the range of 1× through 50×, the control is performed in the same way as in the situation where the illuminance is above the required level.

Next, it will be described how the relation between the zoom power m and the coefficient α changes in the zoom power range of 50× or more. According to the method of controlling the coefficient when zooming is performed with ample illuminance, α is fixed at α2 once the zoom power has exceeded 50×. However, if the illuminance is short of the required level, the image processing section 190 decreases α from α2 linearly so that α=0 when the zoom power reaches 100× (i.e., when the digital zoom power is 4×).

This is processing to get done when a shooting condition that will cause a lot of noise needs to be considered. That is to say, according to the super-resolution processing of this preferred embodiment, the RF component is extracted, the magnitude of the RF component h is multiplied by a coefficient, and the product is added to the luminance value of an interpolated pixel, thereby maintaining some degree of sharpness for an edge portion. If there is a lot of noise, however, the noise accounts for a significant percentage of the RF component. On top of that, the higher the digital zoom power, the even more significant the noise itself gets. In that case, the effect of compensating for the profile's sharpness will be dominated by the disadvantage caused by such a lot of noise. That is why even in such a shooting condition that causes a lot of noise, the same degree of sharpness can be maintained for an edge portion as in the first preferred embodiment if the zoom power is equal to or smaller than a certain value. But once the zoom power has become so high as to cause significant noise, the noise included in the magnitude of correction δ may be reduced by decreasing the coefficient α gradually. In this manner, the noise can be reduced to a much less sensible level.

As can be seen easily from the foregoing description, the method of controlling α when zooming is performed with sufficient illuminance is represented by the following Equations (2):

$$\alpha = \begin{cases} \alpha 1 & (1 \leq m < 25) \\ \frac{\alpha 2 - \alpha 1}{25}(m-25) + \alpha 1 & (25 \leq m < 50) \\ -\frac{\alpha 2}{50}(m-50) + \alpha 2 & (50 \leq m \leq 100) \end{cases} \quad (2)$$

The coefficient α is calculated by Equation (1) or (2) according to the illuminance equivalent value and the magnitude of correction δ for generating a super-resolution interpolated pixel can be obtained by using that coefficient α.

Next, the flow of the processing to get done by the digital camcorder 100 of this preferred embodiment will be described with reference to FIG. 6.

Figure 6:
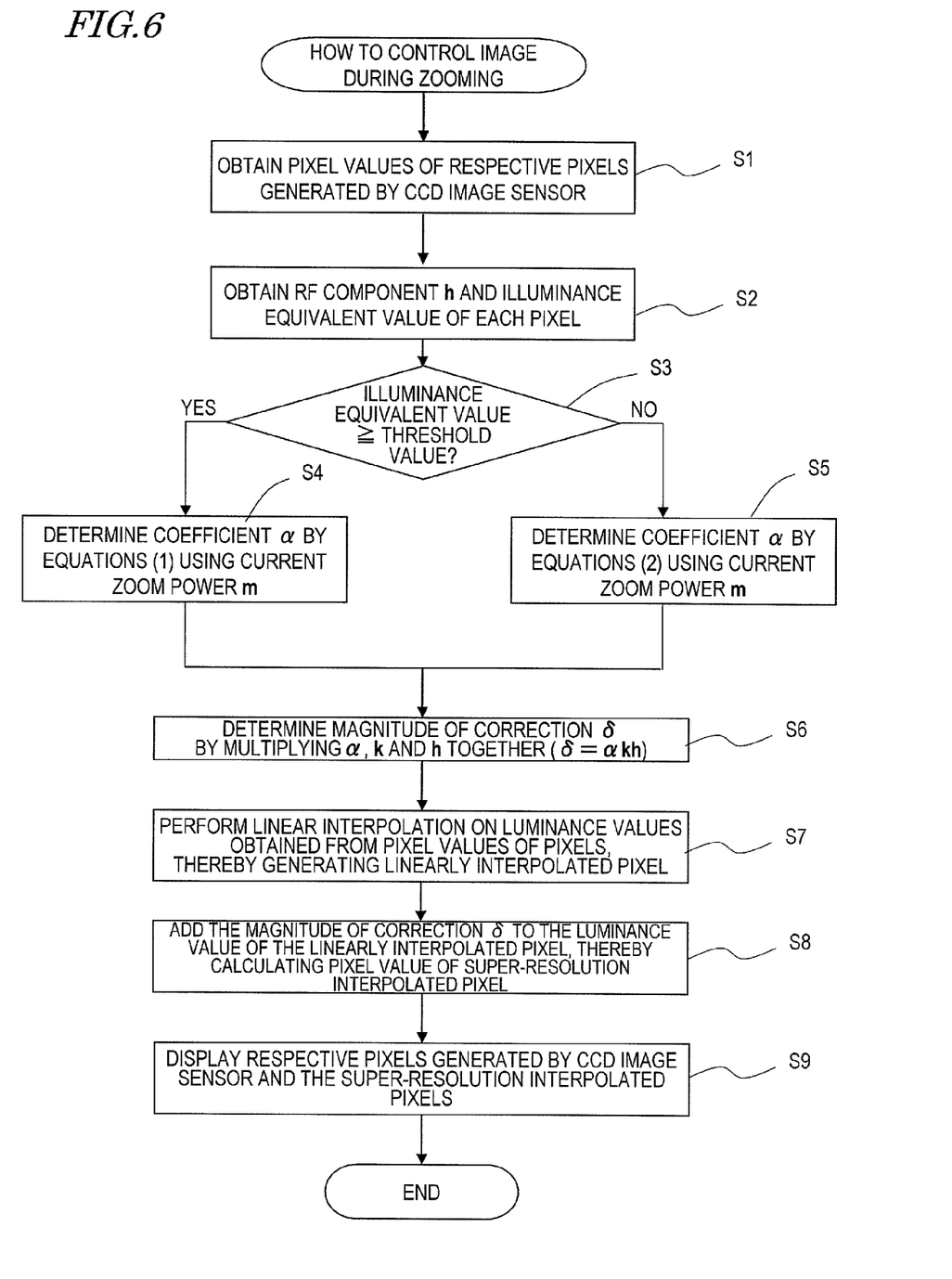
FIG. 6 is a flowchart showing the procedure of the processing to be performed by this digital camcorder 100.

FIG. 6 is a flowchart showing the procedure of the processing to be performed by this digital camcorder 100.

First of all, in Step S1, the image processing section 190 obtains the pixel values of respective pixels of the image that has been generated by the CCD image sensor 180. Next, in Step S2, the image processing section 190 obtains the RF component h and illuminance equivalent value of each of those pixels. As described above, according to this preferred embodiment, the average luminance of the pixel values of respective pixels is adopted as the illuminance equivalent value.

Then, in Step S3, the image processing section 190 determines whether or not the illuminance equivalent value is equal to or greater than a threshold value. If the answer is YES, the process advances to Step S4. Otherwise, the process advances to Step S5.

In the processing step S4, the image processing section 190 determines the coefficient α by Equations (1) using the current zoom power m. On the other hand, in the processing step S5, the image processing section 190 determines the coefficient α by Equations (2) using the current zoom power m. In both of these two cases, the process advances to Step S6 after that.

In the processing step S6, the image processing section 190 determines the magnitude of correction δ by multiplying α, k and h together (i.e., δ=αkh), where the coefficient k is a value to be determined depending on whether the target location of correction is surrounded with an edge portion or a flat portion.

Thereafter, in Step S7, the image processing section 190 performs linear interpolation processing on the luminance values that have been obtained from the pixel values of each pair of pixels, thereby generating a linearly interpolated pixel between them.

Subsequently, in Step S8, the image processing section 190 adds the magnitude of correction δ to the luminance value of the linearly interpolated pixel, thereby calculating the pixel value of a super-resolution interpolated pixel.

Finally, in Step S9, the image processing section 190 sends every pixel value calculated to the controller 210, which displays, on the LCD monitor 270, not only the respective pixels of the image generated by the CCD image sensor 180 but also the super-resolution interpolated pixels as well.

In the example shown in FIG. 6, either Equations (1) or Equations (2) is chosen according to the illuminance equivalent value. However, α may be calculated by either the method shown in FIG. 4 or the one shown in FIG. 5, irrespective of the illuminance equivalent value.

Although the present invention has been described by way of illustrative preferred embodiments, those preferred embodiments are only examples and the present invention is in no way limited to those specific preferred embodiments. The optical system and drive system of the digital camcorder 100 of the preferred embodiment shown in FIG. 1 are just examples and do not always have to be used. For example, in the preferred embodiment illustrated in FIG. 1, the optical system is supposed to consist of three groups of lenses. However, the optical system may also consist of any other groups of lenses. Furthermore, each of those lenses may be a single lens or a group of multiple lenses.

Also, in the preferred embodiments of the present invention described above, the image capturing means is supposed to be a CDD image sensor 180. However, the present invention is in no way limited to those specific preferred embodiments. Alternatively, the image capturing means may also be a CMOS image sensor or an NMOS image sensor.

Furthermore, in the preferred embodiments described above, the method for interpolating pixels is supposed to be linear interpolation. However, this is only an example of the present invention. Alternatively, either bi-cubic interpolation or spline interpolation may also be used.

Also, in the preferred embodiments described above, the coefficient α in the optical zoom range is supposed to be a positive constant value α1. However, if the decrease in the degree of sharpness due to the optical property of the lenses is not a serious problem, α1 may also be zero and no super-resolution processing may be applied to the optical zoom range. In that case, no noise reduction will be made by the super-resolution processing in the optical zoom range.

Furthermore, in the preferred embodiments described above, once the zoom power exceeds 50×, the coefficient α that has been increased is either fixed at a constant value or decreased. However, that zoom power does not have to be 50×.

Figure 7A:
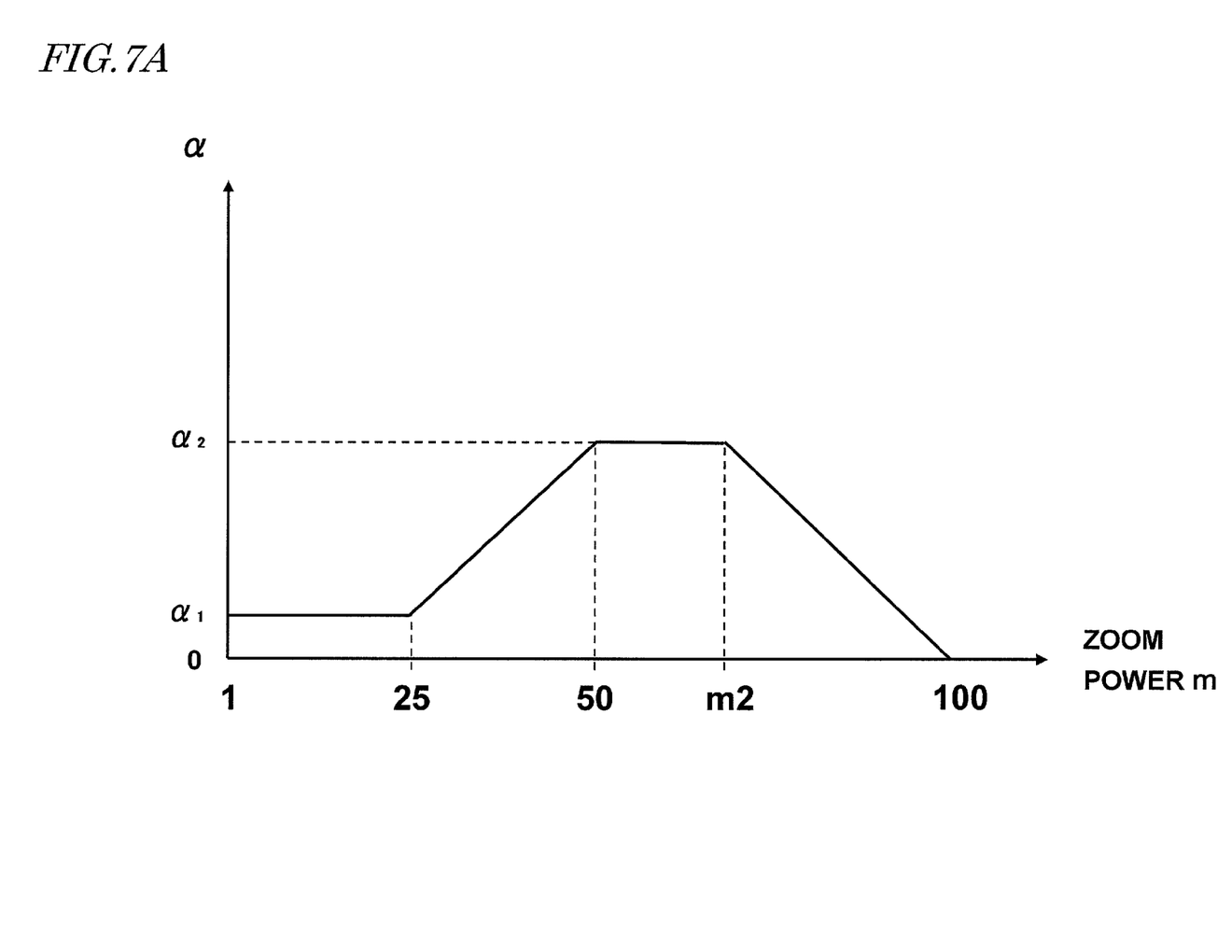
FIG. 7A shows the relation between the zoom power m and the coefficient $\alpha$ in a modified example of the present invention.

Also, according to the method of controlling the coefficient when subject is zoomed in with insufficient illuminance, as soon as the zoom power exceeds 50×, the coefficient α starts being decreased. However, the control operation may also be performed so that the coefficient α is kept constant until the zoom power reaches another predetermined value m2 (where 50<m2<100) and then decreased until the zoom power reaches 100×. In that case, the effect of preventing the video from looking unnatural to be achieved by the control method for the situation where the subject is zoomed in with the sufficient illuminance and the effect of making the noise much less sensible to be achieved by the control method for the situation where the subject is zoomed in with the insufficient illuminance can be achieved at the same time. FIG. 7A shows the relation between the zoom power m and the coefficient α in such a modified example.

Figure 7B:
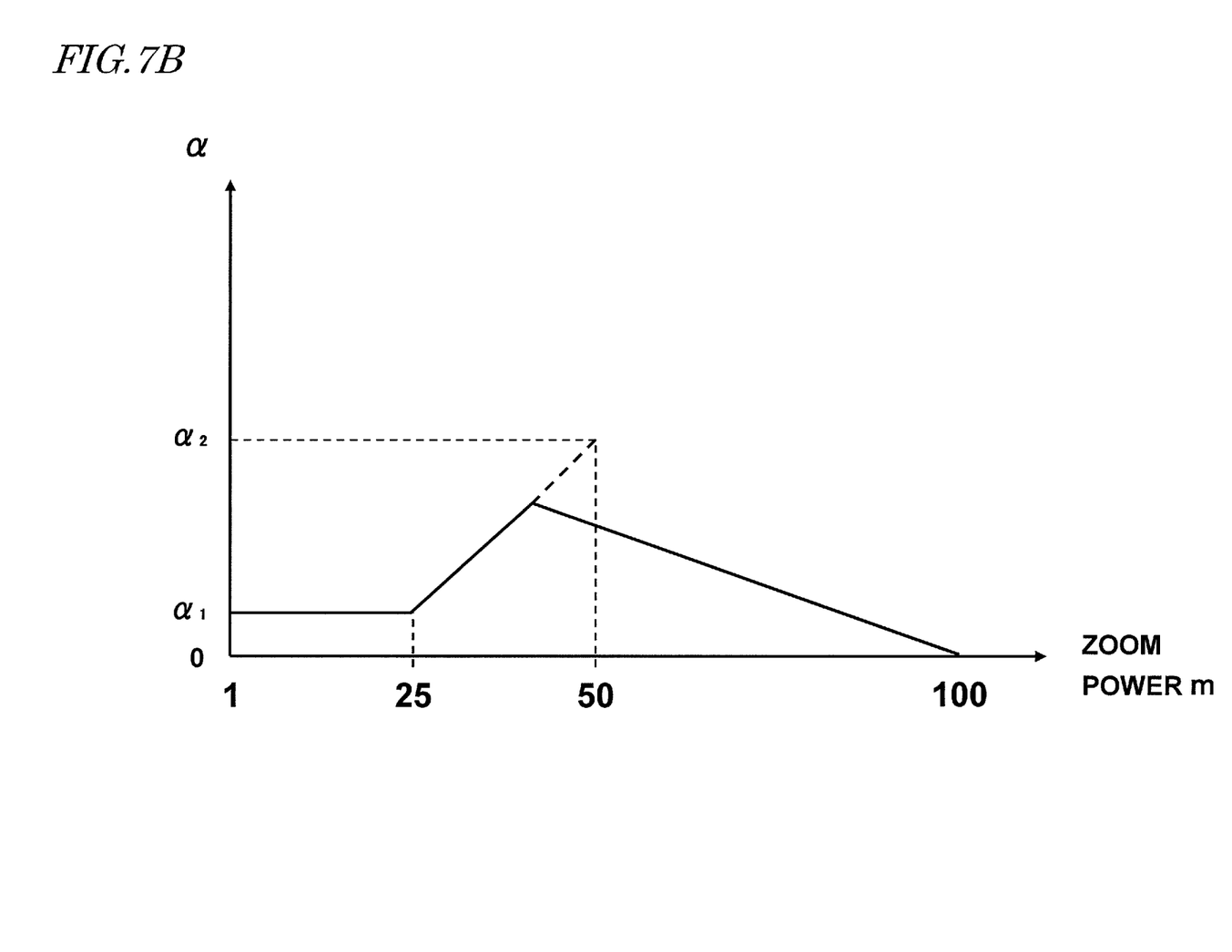
FIG. 7B shows the relation between the zoom power m and the coefficient $\alpha$ in another modified example of the present invention.
Figure 7C:
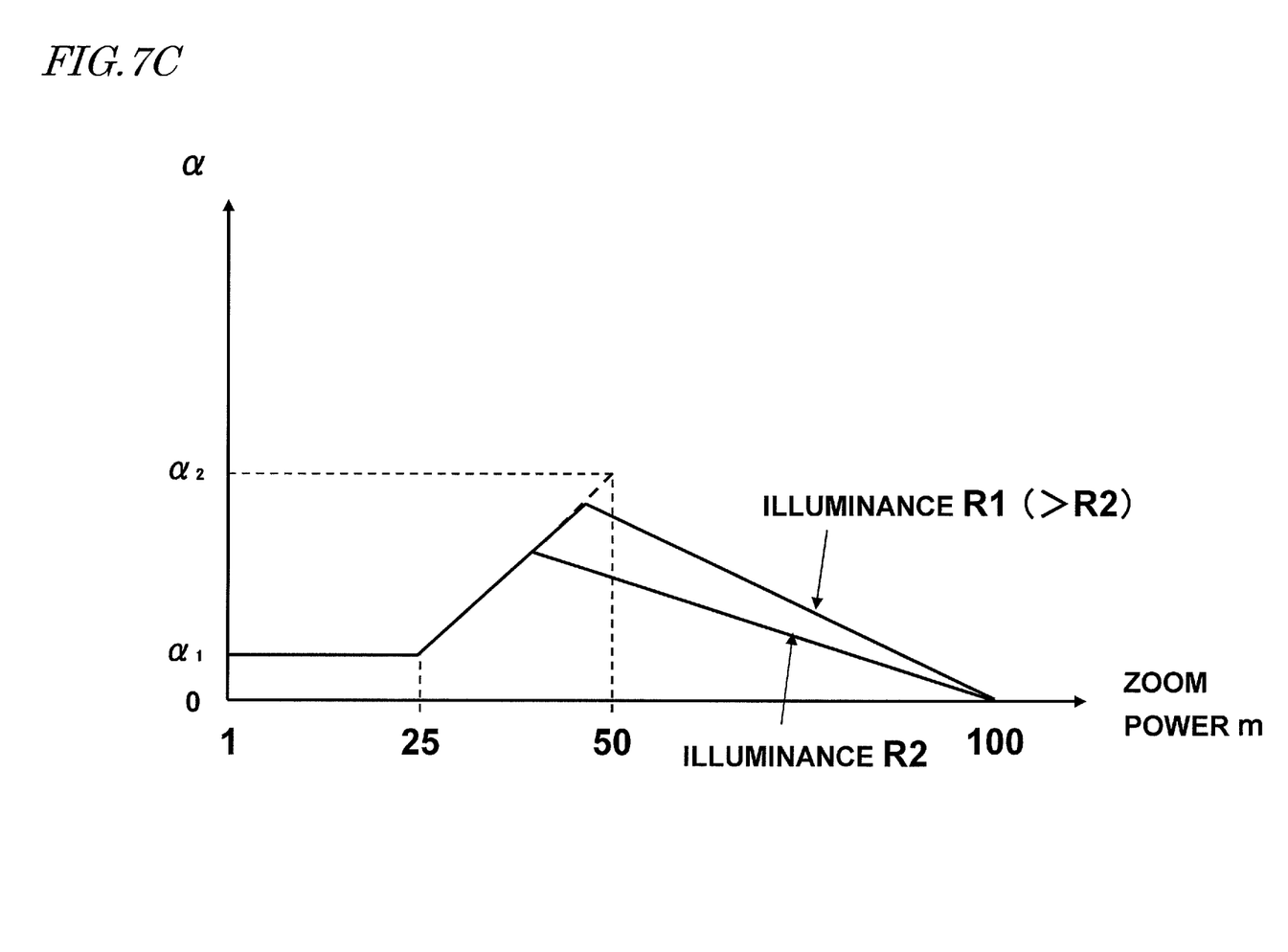
FIG. 7C shows the relation between the zoom power m and the coefficient α in still another modified example of the present invention.

Two more modified examples are shown in FIGS. 7B and 7C. Specifically, FIG. 7B illustrates an example in which even before the zoom power reaches 50×, the coefficient α starts to be decreased more gently than the coefficient α shown in FIG. 5 that starts to be decreased when the zoom power reaches or exceeds 50×. On the other hand, FIG. 7C shows an example in which the gradient of the coefficient α to be decreased is changed according to the magnitude of the illuminance equivalent value. In this case, the greater the illuminance equivalent value (i.e., the brighter), the more steeply the coefficient α decreases. In other words, the smaller the illuminance equivalent value (i.e., the darker), the more gently the coefficient α decreases.

Furthermore, in the preferred embodiments described above, the highest optical zoom power at the telephoto focal length is supposed to be 25× and the maximum zoom power (including digital zoom) is supposed to be 100×. However, these are only examples and any other zoom powers may also be set.

The present invention is applicable to image capture devices such as digital camcorders and digital cameras.

What is claimed is:

1. An image capture device comprising: an optical system for producing a subject image; an imager, which receives the subject image and outputs an image signal representing the subject image; and an image processing section for zooming in, or zooming out, on a given image based on the image signal and in accordance with information about a zoom power specified, to generate a new image signal with the zoom power changed, wherein the image processing section zooms in on the subject image by interpolating pixels upon which zoom in is to be performed to increase the number of pixels, wherein until the zoom power specified reaches a predetermined value, the image processing section zooms in on the subject image by interpolating pixels so that degree of sharpness given to a resulting image increases, wherein if a value representing illuminance of the subject image is equal to or greater than a predefined value and if the zoom power specified has reached, or exceeded, the predetermined value, the image processing section fixes the degree of sharpness given to the resulting image, and wherein if the value representing the illuminance of the subject image is less than the predefined value and if the zoom power specified has reached, or exceeded, the predetermined value, the image processing section decreases the degree of sharpness given to the resulting image.

2. The image capture device of claim 1, wherein the image processing section generates at least one interpolated pixel by making interpolation between multiple pixels that are designated by the image signal, and changes magnitude of correction to be made on pixel value of the at least one interpolated pixel according to the value representing the illuminance of the image and the zoom power specified in order to increase the degree of sharpness given to the image.

3. The image capture device of claim 2, wherein during zooming, the magnitude of correction to be made on the pixel value of the at least one interpolated pixel is determined by using a coefficient α that changes with the zoom power specified, and
wherein if the value representing the illuminance of the image is equal to or greater than the predefined value and if the zoom power specified has reached, or exceeded, the predetermined value, the image processing section fixes the coefficient, thereby keeping the degree of sharpness given to the image constant.

4. The image capture device of claim 2, wherein during zooming, the magnitude of correction to be made on the pixel value of the at least one interpolated pixel is determined by using a coefficient α that changes with the zoom power specified, and
wherein if the value representing the illuminance of the image is less than the predefined value and if the zoom power specified has reached, or exceeded, the predetermined value, the image processing section decreases the coefficient α according to the zoom power specified, thereby decreasing the degree of sharpness given to the image.

5. The image capture device of claim 2, wherein the image processing section calculates the magnitude of correction based on the coefficient α, another coefficient k, which is determined by magnitude of a variation in luminance value of the at least one interpolated pixel, and magnitude h of radio frequency components of each pixel.

* * * * *